US008219682B2

(12) United States Patent
G et al.

(10) Patent No.: US 8,219,682 B2
(45) Date of Patent: Jul. 10, 2012

(54) AUTOMATIC DETECTION OF AGENTS

(75) Inventors: LakshmiNarasimham G, Coimbatore (IN); Abdul Gafoor, Bangalore (IN); Raghavendra PD, Bangalore (IN); Ravikumar Shankaran, Bangalore (IN)

(73) Assignee: Nokia Siemens Networks GmbH & Co. KG, Munich (DE)

(*) Notice: Subject to any disclaimer, the term of this patent is extended or adjusted under 35 U.S.C. 154(b) by 95 days.

(21) Appl. No.: 12/308,655

(22) PCT Filed: Jun. 18, 2007

(86) PCT No.: PCT/EP2007/056010
§ 371 (c)(1),
(2), (4) Date: Aug. 9, 2010

(87) PCT Pub. No.: WO2007/147799
PCT Pub. Date: Dec. 27, 2007

(65) Prior Publication Data
US 2010/0299412 A1    Nov. 25, 2010

(30) Foreign Application Priority Data
Jun. 19, 2006  (IN) ................................ 606/KOL/06

(51) Int. Cl.
*G06F 15/173* (2006.01)
(52) U.S. Cl. ....................................... 709/226; 709/224
(58) Field of Classification Search .................. None
See application file for complete search history.

(56) References Cited

U.S. PATENT DOCUMENTS

| 5,185,860 | A  | *  | 2/1993  | Wu ................................ 709/224 |
| 5,909,549 | A  |    | 6/1999  | Compliment et al. |
| 6,192,402 | B1 | *  | 2/2001  | Iwase ............................ 709/223 |
| 6,496,859 | B2 | *  | 12/2002 | Roy et al. ...................... 709/223 |
| 6,633,909 | B1 | *  | 10/2003 | Barrett et al. ................. 709/224 |
| 7,406,515 | B1 | *  | 7/2008  | Joyce et al. ................... 709/224 |
| 7,711,803 | B2 | *  | 5/2010  | Doshi et al. ................... 709/223 |
| 7,756,958 | B2 | *  | 7/2010  | Nagarajrao et al. .......... 709/223 |
| 7,768,946 | B2 | *  | 8/2010  | Salonen ........................ 370/255 |
| 7,778,189 | B2 | *  | 8/2010  | Valli et al. .................... 370/244 |
| 2002/0161883 | A1 | * | 10/2002 | Matheny et al. ............. 709/224 |
| 2003/0112765 | A1 |   | 6/2003  | Gaspard et al. |
| 2004/0010510 | A1 | * | 1/2004  | Hotti ......................... 707/103 R |
| 2005/0038883 | A1 | * | 2/2005  | Elko et al. .................... 709/223 |
| 2005/0226224 | A1 | * | 10/2005 | Lee et al. ...................... 370/352 |
| 2009/0222907 | A1 | * | 9/2009  | Guichard ........................ 726/17 |
| 2010/0299412 | A1 | * | 11/2010 | G et al. ........................ 709/220 |

OTHER PUBLICATIONS

V. Sundramoorthy et al., "Functional Principles of Registry-based Service Directory" Proceedings of the IEEE Conference on Local Computer Networks 30th Anniversary, Chapter 1-2, pp. 209-217, 2005.

* cited by examiner

*Primary Examiner* — David England
(74) *Attorney, Agent, or Firm* — Staas & Halsey LLP

(57) ABSTRACT

A telecommunication network has agents, managers for configuring agents, and at least one central directory service element with a memory to store information about these agents and these managers, which information is at least partly used in case of a further agent or manager being inserted into the telecommunication network. The central directory service element can use an object model and it can support a handshake mechanism for enabling communication between an agent and a manager in case of a new agent or manager in the telecommunication network.

27 Claims, 3 Drawing Sheets a. EM waits for the *broadcastSelf ()* notification from the CDS.
b. EM registers with CDS using *registerEMWithCDS ()*.
c. CDS broadcasts this information to all the NEs which can be managed by the EM using *broadcastEMCreated ()*.
d. The NEs retrieve the information about the EM using *getEMFromCDS ()*.
e. NEs administer the EM automatically.
f. The EM retrieves all the NEs from the CDS using *getAllNEsRegisteredWithCDS ()*.
g. EM administers the NE.
h. The NE and the EM perform the handshake to complete the administration.
i. Steps g to f are repeated for all NEs.

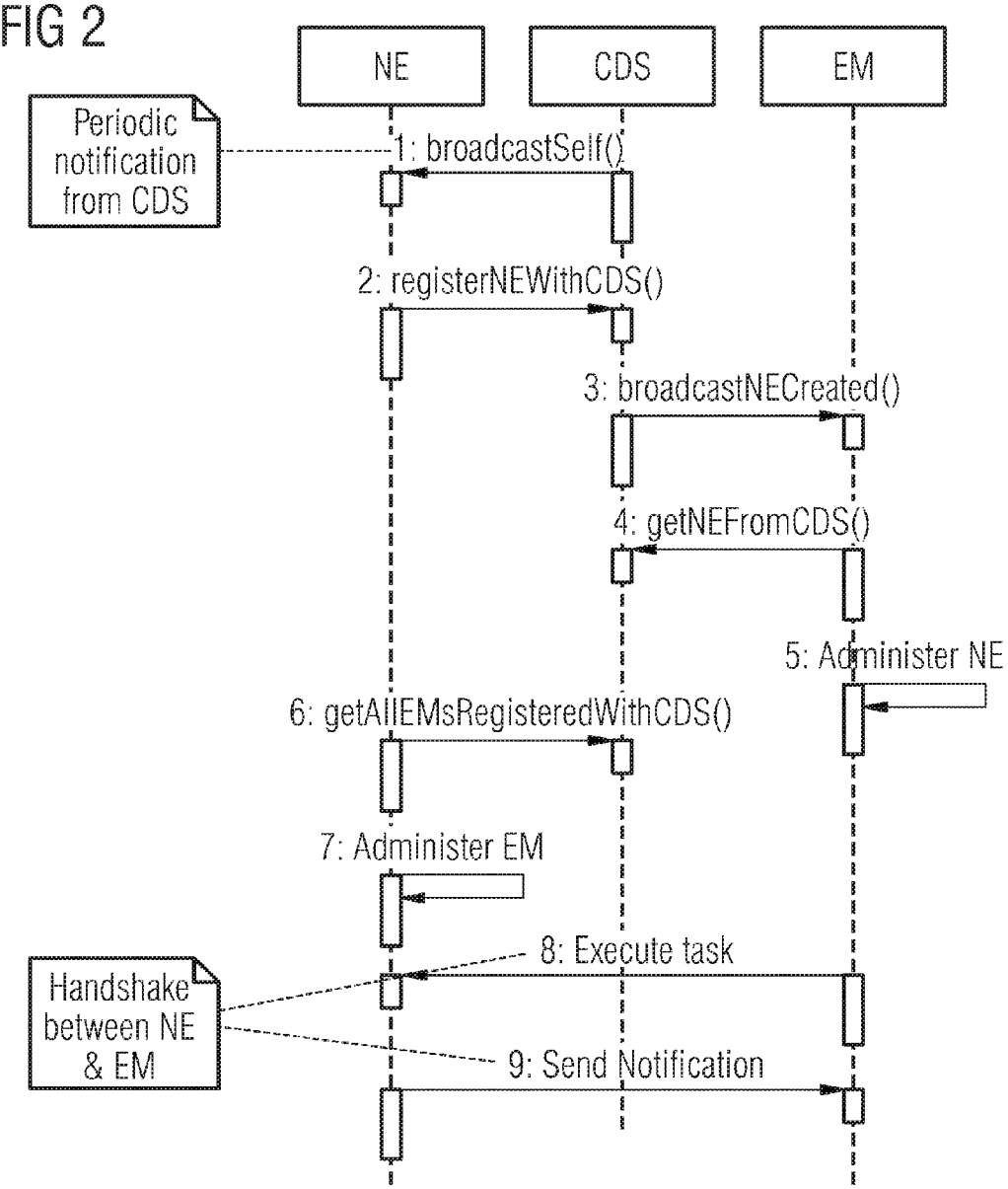

a. NE waits for the *broadcastSelf ()* notification from the CDS after it is brought up.
b. NE registers with CDS using *registerNEWithCDS ()*.
c. CDS broadcasts this information to all the managers which are suitable for this NE type using the notification *broadcastNECreated ()*.
d. The managers retrieve details about the NE using *getNEFromCDS ()*.
e. The managers administer these NEs automatically.
f. The NE retrieves information about all the EMs using *getAllEMsRegisteredWithCDS ()*.
g. NE administers the EM.
h. The NE and the EM perform the handshake to complete the administration.
i. Steps g to f are repeated for all EMs.

FIG 3

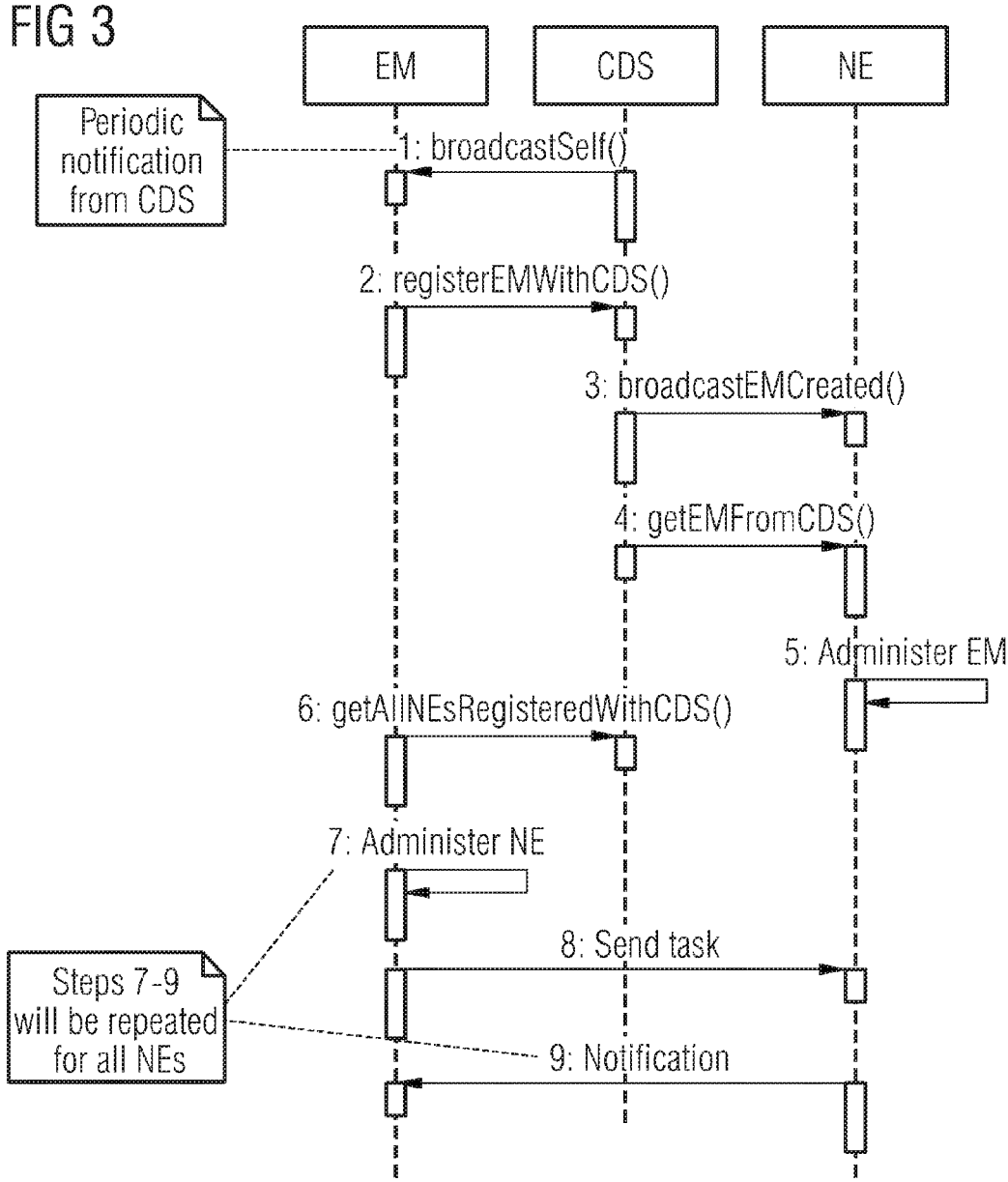

a. EM waits for the *broadcastSelf ()* notification from the CDS.
b. EM registers with CDS using *registerEMWithCDS ()*.
c. CDS broadcasts this information to all the NEs which can be managed by the EM using *broadcastEMCreated ()*.
d. The NEs retrieve the information about the EM using *getEMFromCDS ()*.
e. NEs administer the EM automatically.
f. The EM retrieves all the NEs from the CDS using *getAllNEsRegisteredWithCDS ()*.
g. EM administers the NE.
h. The NE and the EM perform the handshake to complete the administration.
i. Steps g to f are repeated for all NEs.

AUTOMATIC DETECTION OF AGENTS

CROSS REFERENCE TO RELATED APPLICATIONS

This application is based on and hereby claims priority to Indian Application No. 606/KOL/06 filed on Jun. 19, 2006 and PCT Application No. PCT/EP2007/056010 filed on Jun. 18, 2007, the contents of which are hereby incorporated by reference.

BACKGROUND OF THE INVENTION

The invention concerns a method, a telecommunication network, and a central directory service element for managing components of the telecommunication network.

A telecommunications network is usually composed of different types of agents NE (which agents could also e.g. be "Network Elements" here).

An operator uses a Manager EM (which Manager could e.g. be an "Element Manager" here) to manage these agents. In order to manage a agent, the operator has to carry out some steps for configuring the agent on the manager like providing the address of the NE for communication, the user information to access the NE and so on. Similarly the operator also has to go through a few steps to configure the Manager on the Agent. These steps may vary depending on the type of the agent. Great care has to be taken while performing the administration since any mistake would mean more time will be spent on correcting it. Some times it is also required to configure the same agent on more than one managers.

All the agents in the telecommunications network need not be supplied by the same vendor. Vendors of agents usually provide their own Manager System to manage their NEs. The way these administrative steps have to be carried out on each of these Managers might differ significantly. This introduces additional overhead for the operator since he has to work on different Manager Systems.

Thus, the time and effort spent by the operator can be minimized if there is a more simple way of administering any type of NE on any Element Manger. This solution provides an automatic way of detecting Agents and Managers.

Currently, no solution exists which provides a single and easy way to administer NEs. Some solutions exist for automatic detection of agents in the SNMP world but these are specific to devices which support the SNMP protocol and do not present a generalized approach for all NE types. This solution cannot be extended to other protocols since implementing such a feature might not be possible because of restrictions imposed by the basic principle of the protocol. On the other hand the current idea proposes a generic framework for automatic detection of all type of NEs.

U.S. Pat. No. 5,909,549A describes a "Management station locating method for computer network management system". This solution is specific to the SNMP protocol US2003112765A1 describes a "Network devices discovering for data communication network". This solution is also specific to SNMP protocol FI9901022A describes a "Agent connecting method in telecommunications network". This solution only allows a Agent to connect to a Network Management system whereas the proposed solution allows a connection to be established from the Network Management system to the NE also.

SUMMARY

It is one possible object to improve the configuration of network components in a telecommunication network.

The inventors propose a telecommunication network having agents, managers for configuring agents, and at least one central directory service element with a memory to store information about the agents and the managers, which information is at least partly used in case of a further agent or manager is inserted into the telecommunication network.

The inventors also propose a method for configuring agents and managers in a telecommunication network. According to the method, information is stored about agents and the managers of the telecommunication network, the information being stored in a memory of a central directory service element. This information is used to selectively notify the agents and managers of the telecommunication network when a new agent and/or a new manager is inserted into the telecommunication network and to configure communication with the new agent and/or manager.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 schematically shows how according to the proposed method a new agent NE can be inserted in the cellular telecommunication network.

FIG. 3 schematically shows how according to the proposed method a new manager EM can be inserted in the cellular telecommunication network.

DETAILED DESCRIPTION OF THE PREFERRED EMBODIMENT

Figure 1:
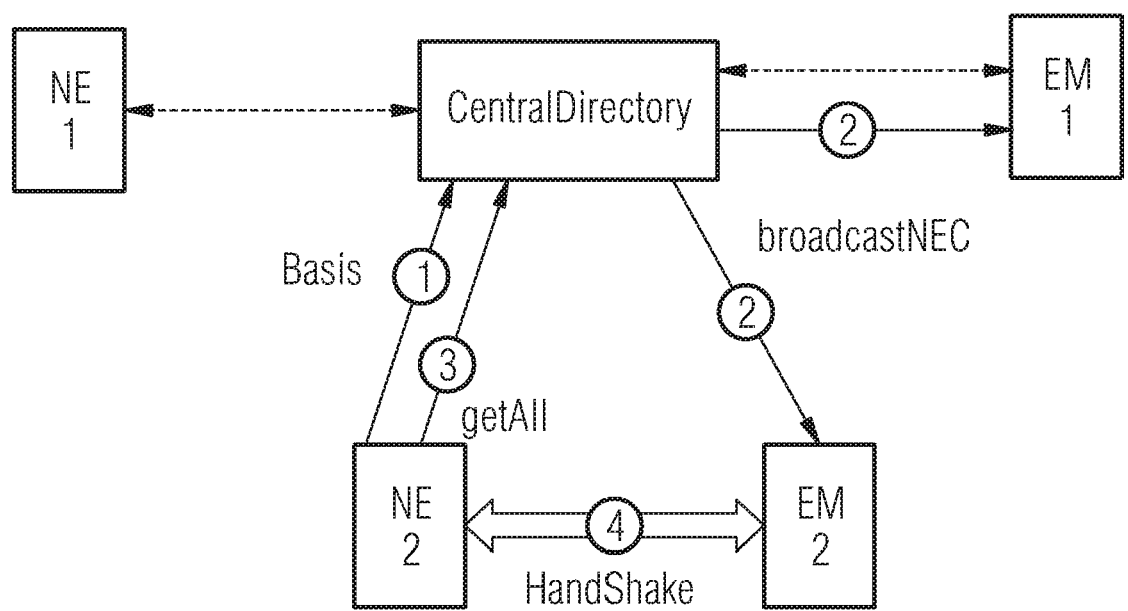
FIG. 1 schematically shows the general architecture of a cellular telecommunication network using the proposed method invention.

Reference will now be made in detail to the preferred embodiments of the present invention, examples of which are illustrated in the accompanying drawings, wherein like reference numerals refer to like elements throughout.

The proposed solution allows automatic detection of Agents (NE) and Managers (EMs). To achieve this, the idea introduces a "Central Directory Service" (CDS) into the network. The CDS stores information about all the Agents (NE) and the Managers (EM) available in the network. Any new NE which comes into the network can retrieve the list of managers EMs from the CDS and initiate the process of automatic detection with the help of the CDS. Similarly, a new EM can also get the list of NEs available in the network from the CDS and trigger the process of automatic detection.

The automatic detection of the NE or the EM can be made more reliable by introducing a handshake procedure between the NE and the EM.

System Architecture

FIG. 1 shows the architecture of the proposed system. The difference of this architecture from the existing Network Management Framework is the addition of the central directory service (CDS) and a handshake procedure between the NE and the EM. The architecture of the CDS and the handshake mechanism is explained in the following sections.

Central Directory Service

The central directory service (CDS), is a directory containing information about all the Agents and Manager systems within the network. The CDS provides interfaces through all protocols supported by the different NEs and EMs Thus NEs and EMs can access the same information using their native protocol itself. An object model which outlines the data that will be contained in the CDS and the operations that can be performed on the CDS is described.
Object Model for CDS
ManagedObjectClass
centralDirectoryService
"This object describes a central directory service class which would hold details about Agents, Managers available in a network.'
Attributes
i. centralDirectoryServiceDetails—'Connection details of the CDS'
   Port Number
   IP Address
ii. neDetails—'Details of a NE'
   NeIdentifier—ˆGraphic String that identifies the NE'
   NeType (as described below)
   TaskDBDetails (as described below)
   SupportedInterfaces (as described below)
   SupportedApplications (as described below)
   Contained Devices
iii. neDetailsList—'To capture the list of Ne Managed by EM'
   List of NEDetails
iv. ElementManagerDetails—'Details of an EM'
   ElementManagerIdentifier (as described below)
   TaskDBDetails (as described below)
   SupportedNETypes—same as the NeType (as described below)
   SupportedApplications (as described below)
   SupportedInterfaces (as described below)
   ManagedNeDetails—is NeDetailsList
v. ElementManagerDetailsList—'To capture the list of available EMS'
   List of ElementManagerDetails
vi. neDeviceDetails—'The fields that will be used will depend on the protocol'
   NeDeviceID—'graphic string which identifies the Ne Device'
   IPAddress—'graphic string that gives the IP address'
   ApplicationTitle—'APT—"1 3 12 2 1107 3 84 20 0"
   Application Entity—203
   Application Context—'0 2 262 1 3 10 0 4'
   P Sel
   S Sel
   T Sel
   Listening Port
   ManagerEMDetails—is ElementManagerDetailsList
   ContainedDevices—'Each NE Device can have contained devices A NE might be composed of more than one device capable of communicating with EM'
vii. ContainedDevices—'This is to capture the containment of Nodes or Sub-Nodes'
   List of NeDeviceDetails—List of NeDeviceDetails
viii. ElementManagerIdentifier—'Address information of the EM'
   ElementManagerId—'Graphic String that identifies the EM'
   ElementManagerIPAddress—'Graphic string which has the IP Address'
ix. ElementManagerList
   List of ElementManagerIdentifier
x. neType—'Describes the type of NEs available in the network. This is not an exhaustive list. Only a sample list is provided to indicate what this attribute means'
   CP
   CPMP
   MPSP
   SP
   ngRNC node B
   MSC
   BSC
xi. taskDBDetails—'Describes the task object file of the NE. It is a free string to identify the task db of the NE'
   GraphicString
xii. supportedInterfaces—'Interfaces that will be supported by NEs and EMs in the network. ˆThis is not an exhaustive list. Only a sample list is provided to indicate what this attribute means'
   MML
   Q3
   SNMP
   CORBA
   FT
   TELNET
xiii. supportedApplications—'Applications that will be supported by NEs and EMs in the network. 'This is not an exhaustive list. Only a sample list is provided to indicate what this attribute means'
   FM—Fault Management
   CM—Configuration Management
   PM—Performance Management
   SM—Security Management
Actions
   i. registerNEwithCDS ([in] NeDetails)
      To register the NeDetails to the CDS
   ii. registerEMwithCDS ([in] ElementManagerDetails)
      To register the EM to the CDS
   iii. UnregisterNEwithCDS ([in] NeDetails)
      To Unregister the NeDetails to the CDS
   iv. UnregisterEMwithCDS ([in] ElementManagerDetails)
      To Unregister the EM to the CDS
   v. getAllNEsRegisteredWithCDS ([in] ElementManagerDetails, [out] NeDetailsList)
      To get the NEs registered in the CDS
      The ElementManagerDetails is looked into to validate the EM
      The NeDetailsList should be a list of NEs which match the NeType as mentioned in ElementManagerDetails SupportedNETypes
   vi. getAllEMsRegisteredWithCDS ([in] NeDetails, [out] ElementManagerDetailsList)
      To get the EMs registered in the CDS
      The NeDetails is looked into to validate the NE
      The ElementManagerDetails should be a list which match the SupportedNeType as mentioned in the NeDetails NeType
   vii. getNEFromCDS ([in] NeIdentifier, [in] ElementManagerDetails, [out] NeDetails)
      To get one NE which was added to the CDS
      The ElementManagerDetails is used for validation
      The ElementManagerDetails SupportedNeType would be used to check if the NE asked for can be managed by this EM
   viii. getEMFromCDS ([in] ElementManagerIdentifier, [in] NeDetails, [out] ElementManagerDetails)
      To get one EM which was added to the CDS
      The NeDetails is used for validation
      The NeDetails NeType would be used to check if the EM asked for can manage this NE
Notifications
   i. broadcastSelf ( )

This notification broadcasts periodically the details of central directory services, that is the central DirectoryServiceDetails ii. broadcastNECreated ( )

This notification is given to all the EMs registered in the CDS whenever a NE is created iii. broadcastEMCreated ( )

This notification is given to all the NEs registered in the CDS whenever a EM is created Availability of the CDS Since the CDS is a single source of information about the network, a failure in the CDS can affect the normal functioning of the network. It should be possible to have a redundant CDS in order to prevent such a situation. The data contained in the CDS does not change very dynamically hence replicating the data on another CDS should be easy using any existing technique for replication. In case a working CDS goes down, the redundant CDS can take over. Different ways exist using which the redundant CDS can learn about the failure of the primary CDS. For example, The redundant CDS can know about the failure if the broadcastSelf () notification is not received for a predefined interval.

Handshake Between the NE and EM

Once the automatic detection of the NE and the EM is complete, the NE and the EM can communicate with each other. But when the EM does not want to manage a NE or when a NE does not want to be managed by an EM, there has to be some mechanism to undo the automatic detection. This can be achieved by introducing a mechanism which will enable the NE to communicate its willingness to be managed by the EM and the EMs willingness to manage the NE. This can either be achieved automatically or through manual intervention by the operator. This mechanism is referred to as the handshake between the NE and the EM.

System Functioning

The CDS maintains a list of all NEs and EMs that are currently available in the network. It periodically sends the "broadcastSelf" notification to all the NEs and the EMs. Any new NE or EM which is introduced into the network should register itself with the CDS giving all the required details. Two different cases exist, which are explained below Example of a Handshake Mechanism The following example of a handshake mechanism is considered for explaining the two cases. The EM sends a task to the NE after it completes the administration. The NE sends a notification to the Manager after sending the response to the task. For the handshake to complete the EM should have successfully executed the task and should also have received the notification from the NE. If the task fails or if the notification is not received from the NE by the EM, it does not administer the NE. If the NE does not receive a task from the EM for a predefined period, it does not administer the EM. The EM retries the task a few times before giving up.

Case 1 (FIG. 2): A new NE is Created a. NE waits for the broadcastSelf ( ) notification from the CDS after it is brought up.
b. NE registers with CDS using registerNEWithCDS ( )
c. CDS broadcasts this information to all the managers which are suitable for this NE type using the notification broadcastNECreated ( )
d. The managers retrieve details about the NE using getNEFromCDS ( )
e. The managers administer these NEs automatically.
f. The NE retrieves information about all the EMs using getAllEMsRegisteredWithCDS ( )
g. NE administers the EM
h. The NE and the EM perform the handshake to complete the administration
i. Steps g to f are repeated for all EMs.

Case 2 (FIG. 3): A new EM is created a. EM waits for the broadcastSelf ( ) notification from the CDS
b. EM registers with CDS using registerEMWithCDS ( )
c. CDS broadcasts this information to all the NEs which can be managed by the EM using broadcastEMCreated ( ).
d. The NEs retrieve the information about the EM using getEMFromCDS ( )
e. NEs administer the EM automatically.
f. The EM retrieves all the NEs from the CDS using getAllNEsRegisteredWithCDS ( )
g. EM administers the NE
h. The NE and the EM perform the handshake to complete the administration
i. Steps g to f are repeated for all NEs Possible Key Features of the Solution 1. A method of automatic detection of Agents and Managers in a network using a Central Directory Service, enabled by an object model, which allows a new Agent or Manager to be discovered and administered automatically.

2. An improved method of automatic detection of Agents and Managers in a network using a Central Directory Service, enabled by an object model and a handshake mechanism between the NE and the EM, in which the handshake mechanism confirms that the NE and the EM which were detected automatically are interested in communicating with each other.

3. An improved method of automatic detection of Agents and Managers in a network using a Central Directory Service, enabled by an object model, in which redundancy is provided to the CDS to prevent the CDS from becoming a single point of failure.

Possible Advantages of the Solution

1. If a new NE has to be administered, the operator only has to introduce the NE into the network. The Automatic detection process will enable the operator to manage the NE from an Manager almost immediately.

2. If a new EM has to be introduced, then the operator does not have to administer all the NEs on the EM. The automatic detection process will ensure that the manager starts managing the NEs. We can thus make the EM Apluggable' into any network.

3. Since the CDS provides interfaces using all available protocols, all NEs, irrespective of the protocol supported by them, can be discovered automatically.

4. The operator need not remember the steps required to configure a NE or an EM. There is also the benefit of quicker and error free configuration.

5. A standardized object model for the CDS will allow interoperability between NEs and EMs from different vendors. This will give the operator an advantage of managing the whole network composed of NEs from different vendors on a single manager of his choice.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A telecommunication network, comprising:
first agents;

first managers for configuring first agents; and at least one central directory service element with a memory to store information about the first agents and the first managers, which information is at least partly used in case of a second agent or second manager being inserted into the telecommunication network, wherein the telecommunication network is a cellular mobile telecommunication network, wherein, when the second manager is inserted into the telecommunication network, the central directory service element broadcasts information concerning the second manager to all the first agents which are suitable for being managed by the second manager; and wherein the first agents retrieve information about the second manager from the central directory service element to automatically administer the second manager to the first agents.

2. The telecommunication network according to claim 1, wherein when a second agent is inserted into the telecommunication network, the central directory service element makes a list of the first managers in the telecommunication network, the list being made available to the second agent.

3. The telecommunication network according to claim 1, wherein when a second agent is inserted into the telecommunication network, the central directory service element makes information concerning the second agent available to all or some of the first managers in the telecommunication network.

4. The telecommunication network according to claim 3, wherein the central directory service element makes information concerning the second agent available to all the first managers in the telecommunication network suitable for managing the second agent.

5. The telecommunication network according to claim 3, wherein after the central directory service element makes information concerning the second agent available to all the first managers in the telecommunication network suitable for managing the second agent, at least one of the first managers contacts the second agent for configuration.

6. The telecommunication network according to claim 5, wherein the at least one of the managers configures the second agent by providing to the second agent with the address to be used by the second agent for communication.

7. The telecommunication network according to claim 1, wherein after the central directory service element makes information concerning the second manager available, the second manager contacts all or some of the first agents in the telecommunication network.

8. The telecommunication network according to claim 1, wherein second agents and second managers in the telecommunication network are detected by the central directory service element.

9. The telecommunication network according to claim 1, wherein the central directory service element uses an object model.

10. The telecommunication network according to claim 1, wherein the central directory service element supports a handshake mechanism that enables agent-manager communication when a second agent or a second manager is inserted in the telecommunication network.

11. The telecommunication network according to claim 1, wherein there is a primary central directory service element and a secondary central directory service element, the secondary central directory service element storing substantially the same information as the primary central directory service element to backup the primary central directory service element in case of failure.

12. The telecommunication network according to claim 1, wherein the central directory service element is a separate entity or a part of the agents and managers in a hierarchical structure of the telecommunication network.

13. A central directory service element for a telecommunication network having agents and managers for configuring agents, the central directory service element comprising:

a memory to store information about first agents and first managers, which information is at least partly used in case of a second agent or second manager being inserted into the telecommunication network, wherein the telecommunication network is a cellular mobile telecommunication network, wherein, when the second manager is inserted into the telecommunication network, the central directory service element broadcasts information concerning the second manager to all the first agents which are suitable for being managed by the second manager; and wherein the central directory service element makes available information about the second manager upon request from the first agents, said information about the second manager being used by the first agents to automatically administer the second manager to the first agents.

14. The method according to claim 13, wherein when a second agent is inserted into the telecommunication network, the central directory service element makes a list of the first managers in the telecommunication network, the list being made available to the second agent.

15. The method according to claim 13, wherein when a second agent is inserted into the telecommunication network, the central directory service element makes information concerning the second agent available to all or some of the first managers in the telecommunication network.

16. The method according to claim 15, wherein after the central directory service element makes information concerning the second agent available to all the first managers in the telecommunication network suitable for managing the new agent, at least one of the first managers contacts the second agent for configuration.

17. The method according to claim 13, wherein the central directory service element makes information concerning the second agent available to all the first managers in the telecommunication network suitable for managing the second agent.

18. The method according to claim 13, wherein when one of the first managers configures the second agent, the first manager provides the second agent with the address to be used by the second agent for communication.

19. The method according to claim 13, wherein when a second manager is inserted into the telecommunication network, the central directory service element makes information concerning the second manager available to all the first agents in the telecommunication network, which are suitable for being managed by the second manager.

20. The method according to claim 19, wherein after the central directory service element makes information concerning the second manager available, the second manager contacts all or some of the first agents in the telecommunication network.

21. The method according to claim 13, wherein when a second manager is inserted into the telecommunication network, the central directory service element makes information concerning the second manager available to all the first agents in the telecommunication network.

22. The method according to claim 21, wherein after the central directory service element makes information concerning the second manager available, the second manager contacts all or some of the first agents in the telecommunication network.

23. The method according to claim 13, wherein second agents and second managers in the telecommunication network are detected by the central directory service element.

24. The method according to claim 13, wherein the central directory service element uses an object model.

25. The method according to claim 13, wherein the central directory service element supports a handshake mechanism that enables agent-manager communication when a second agent or a second manager is inserted in the telecommunication network.

26. The method according to claim 13, wherein the telecommunication network is a cellular mobile telecommunication network.

27. The method according to claim 13, wherein the central directory service element is a separate entity or a part of the agents and managers in a hierarchical structure of the telecommunication network.

* * * * *